(No Model.)
S. C. FREELS & J. T. McKEAN.
PUNCTURE DETECTOR FOR PNEUMATIC TIRES.
No. 585,200. Patented June 29, 1897.
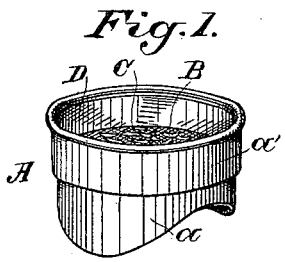
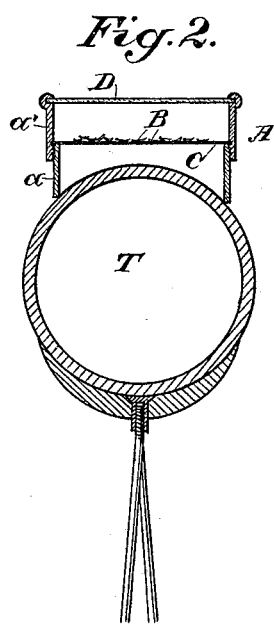
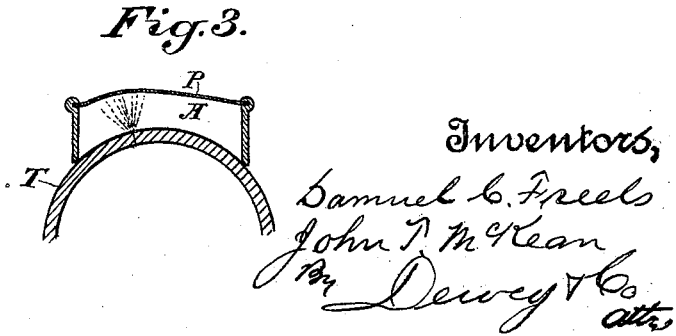
Witnesses,
Inventors,
Samuel C. Freels
John T. McKean
By Dewey & Co.
Attys

UNITED STATES PATENT OFFICE.

SAMUEL C. FREELS, OF HOLLISTER, AND JOHN T. McKEAN, OF SANTA CRUZ, CALIFORNIA.

PUNCTURE-DETECTOR FOR PNEUMATIC TIRES.

SPECIFICATION forming part of Letters Patent No. 585,200, dated June 29, 1897.

Application filed November 29, 1895. Serial No. 570,440. (No model.)

*To all whom it may concern:*

Be it known that we, SAMUEL C. FREELS, residing at Hollister, county of San Benito, and JOHN T. McKEAN, residing at Santa Cruz, county of Santa Cruz, State of California, citizens of the United States, have invented a Puncture-Detector for Pneumatic Tires; and we hereby declare the following to be a full, clear, and exact description of the same.

Our invention relates to devices for detecting punctures or air-escape apertures in receptacles containing air under pressure, especial regard being had to the pneumatic tires of bicycles and other vehicles employing wheels with tires of like character.

Our invention consists in the novel details of construction and arrangement of the device which we shall hereinafter fully describe.

The object of our invention is to provide a simple and effective device for detecting air-holes or punctures in air-containing receptacles.

The particular use of our device is in connection with the pneumatic tires of bicycles and other vehicles employing wheels with tires of like character. The difficulty of detecting the location of a puncture in a pneumatic tire is well known. Much time is lost in this operation, and in many cases its detection is impossible, or at best uncertain, and is often within the power only of one skilled in such searches. The means usually employed for this purpose are not always convenient. The most common practice is by the use of a little water placed over the point at which the puncture is suspected, but even this requires a previous suspicion of the location and in many cases results in a fruitless and long-continued experiment. Another way, and that commonly employed in repair-shops, is to immerse the tire in a body of water and watch for the air-bubbles. This and other means are, as we have before stated, inconvenient and are not always effective. Our device, on the other hand, is simple, can be easily carried by the rider, can be applied by him with perfect accuracy and with certain results of detection.

Referring to the accompanying drawings, Figure 1 is a perspective view of the best form of our device. Fig. 2 is a section of same showing its application to a tire. Fig. 3 is a section showing our device modified as to the means for detecting the passage of the air from the tire or air-receptacle.

A is a casing. Its lower portion is conformed in shape to the receptacle over which it is passed, so that it may form therewith a tight or an approximately tight joint.

In the use of our device in connection with a pneumatic tire the lower portion of the casing is cut or hollowed out, as shown, to conform to the transverse section of the tire T, so that it may fit over said tire and make a close and sufficiently perfect joint and for a communication therewith through the puncture or air-aperture. In connection with the casing are means to detect the passage of the air therein. These means may be any device or part adapted to be moved by the inrushing air—such, for example, as the flexible diaphragm P, (shown in Fig. 3,) which by its movement will show the entrance of the air. Other means, unnecessary herein to show, may be used, but the best means consist of a material which will be visibly or sensibly agitated or moved by the incoming air. Any suitable light or flaky material may be used for this purpose—such as bran or light cotton or fabric of any kind—but we have found in practice that a very good material and one which serves the purpose well is tissue-paper cut up into small pieces.

B represents the material to be agitated. It is best confined within the casing by a bottom C, pervious to air. This bottom may be of any material. Fine wire-gauze answers the purpose well. In the use of our device it is placed upon the tire so as to form a practically air-tight joint therewith and is gradually moved along over the tire. When it reaches the location of the puncture, the air from the tire escaping up into the casing will pass through the pervious bottom C and will agitate or sensibly move the material B upon it, by which means the presence and location of the puncture are determined.

The casing may be of any suitable construction, and in its best form it is made of a lower ring $a$ and an upper ring $a'$, the two being detachably connected by suitable means—as, for example, by screwing upon one another, as we have here shown. This will give an opportunity to place the bottom C and to remove it, if necessary, and also to place the material B within it.

In order to render the device portable without losing any of the material B, the top of the casing may be suitably guarded, and the best way in which to do this is by having a piece of glass D in the top of the casing, which, while confining the material, will permit ready observation.

Having thus described our invention, what we claim as new, and desire to secure by Letters Patent, is—

1. A puncture-detector for pneumatic tires and other air-containing receptacles consisting of a casing adapted to detachably fit the surface of said tire or receptacle, and having a bottom pervious to air, and a loose material upon said bottom adapted to be agitated by the air passing into the casing.

2. A puncture-detector for pneumatic tires and other air-containing receptacles consisting of a casing having its lower portion conformed in shape to fit upon and form an approximately tight joint with the tire or other air-containing receptacle and a bottom pervious to air, and a loose material upon said bottom adapted to be agitated by the air passing into the casing.

3. A puncture-detector for pneumatic tires and other air-containing receptacles consisting of a casing adapted to fit the surface of the tire or receptacle and having a bottom pervious to air, a loose material upon the bottom adapted to be agitated by the air passing into the casing, and a sight-cover in the top of the casing.

4. A puncture-detector for pneumatic tires and other air-containing receptacles consisting of a casing formed of detachably-connected rings, the lower one of which is conformed in shape to fit the surface of the tire or receptacle and form an approximately tight joint therewith, a bottom to said casing pervious to air, a material upon the bottom adapted to be agitated by the air passing into the casing, and a sight-cover in the upper portion of the upper ring of the casing.

In witness whereof we have hereunto set our hands.

SAMUEL C. FREELS.
JOHN T. McKEAN.

Witnesses to S. C. Freels:
THOMAS W. HAWKINS,
GEORGE WAPPLE.
Witnesses to J. T. McKean:
EDWARD LEEDHAM,
W. R. SPRINGER.